(12) United States Patent
Radewagen (10) Patent No.: US 8,622,003 B2
(45) Date of Patent: Jan. 7, 2014

(54) DEVICE FOR THE ON-DEMAND SEALING OF AN OPENING PROVIDED IN THE FRONTAL REGION OF A TRACK-GUIDED VEHICLE, A FRONT NOSE MODULE HAVING SUCH A DEVICE, AND A TRACK-GUIDED VEHICLE HAVING SUCH A FRONT NOSE MODULE

(75) Inventor: Christian Radewagen, Salzgitter (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 13/464,218

(22) Filed: May 4, 2012

(65) Prior Publication Data

US 2012/0291659 A1    Nov. 22, 2012

(51) Int. Cl.
*B61D 17/04* (2006.01)

(52) U.S. Cl.
USPC ............. 105/238.1; 105/1.3; 105/392.5

(58) Field of Classification Search
USPC ............................. 105/1.3, 238.1; 213/75 R
See application file for complete search history.

(56) References Cited

U.S. PATENT DOCUMENTS

| | | | | |
|---|---|---|---|---|
| 3,250,742 A | * | 5/1966 | Raoul | 206/522 |
| 4,441,751 A | * | 4/1984 | Wesley | 296/180.1 |
| 4,727,814 A | * | 3/1988 | Nielsen | 105/1.1 |
| 6,450,556 B1 | * | 9/2002 | Jacobs | 293/107 |
| 6,454,326 B2 | * | 9/2002 | Demarquilly et al. | 293/107 |
| 6,497,183 B2 | * | 12/2002 | Demarquilly et al. | 105/392.5 |
| 6,619,491 B2 | * | 9/2003 | Payne et al. | 213/221 |
| 6,923,483 B2 | * | 8/2005 | Curry et al. | 293/107 |
| 2002/0005142 A1 | * | 1/2002 | Demarquilly et al. | 105/392.5 |
| 2005/0072331 A1 | * | 4/2005 | Moses | 105/392.5 |
| 2007/0107623 A1 | * | 5/2007 | Radewagen | 105/50 |
| 2007/0163462 A1 | * | 7/2007 | Ramser et al. | 105/355 |
| 2012/0204754 A1 | * | 8/2012 | Goebels et al. | 105/15 |

FOREIGN PATENT DOCUMENTS

| | | |
|---|---|---|
| DE | 43 05 892 A1 | 1/1994 |
| DE | 43 00 393 A1 | 7/1994 |
| EP | 0 826 570 A2 | 3/1998 |
| EP | 2 208 655 A1 | 7/2010 |
| FR | 857 108 A | 8/1940 |
| FR | 2 934 550 A1 | 2/2010 |
| NL | 8 900 633 A | 10/1990 |

* cited by examiner

*Primary Examiner* — Jason C Smith
(74) *Attorney, Agent, or Firm* — Cesari and McKenna, LLP (57) ABSTRACT

A device for the on-demand sealing of an opening provided in the frontal region of a track-guided vehicle has sealing member of variable size and a frame for supporting the sealing member. The frame together with the sealing member affixed thereto enclose an area through which the coupling shaft of a central buffer coupling of a track-guided vehicle can be guided. The sealing member is controllable such that the size of the area covered by sealing member can be varied.

10 Claims, 5 Drawing Sheets

DEVICE FOR THE ON-DEMAND SEALING OF AN OPENING PROVIDED IN THE FRONTAL REGION OF A TRACK-GUIDED VEHICLE, A FRONT NOSE MODULE HAVING SUCH A DEVICE, AND A TRACK-GUIDED VEHICLE HAVING SUCH A FRONT NOSE MODULE

BACKGROUND OF THE INVENTION

1. Field of the Invention

The invention relates to a device for the on-demand sealing of an opening provided in the frontal region of a track-guided vehicle through which the coupling shaft of a central buffer coupling connected to the vehicle extends when the vehicle is in coupled or coupling-ready state. The invention further relates to a front nose module for a track-guided vehicle, particularly a railway vehicle, having a frame assembly to affix the front nose module to the front end of the vehicle, wherein the front nose module exhibits a vehicle front-end opening through which the coupling shaft of a central buffer coupling affixed to the front end of the vehicle extends in the coupled or coupling-ready state of the vehicle, and wherein the front nose module further comprises a device of the type specified above for the on-demand sealing of the vehicle-side opening provided in the front nose module. Lastly, the present invention also relates to a track-guided vehicle, particularly a railway vehicle, having a front nose module of the type specified above arranged on a front end of said vehicle as well as a central buffer coupling affixed to a front end of said vehicle.

2. The Prior Art

Providing the front end of a track-guided vehicle with protective fairing is known in the field of rail vehicle technology in order to protect a central buffer coupling provided at said vehicle front end, and particularly the coupling's coupler head, from the elements such as snow, ice, moisture and dirt, when the coupling is not in use or is retracted or pivoted back as needed into a coupling compartment configured behind the fairing. The term "coupling compartment" hereby denotes the space behind the nose cone enclosable by the front-end fairing.

Frequently, part of the protective fairing is configured as a front flap able to be pivoted by means of front flap kinematics so as to open the coupling compartment toward the front end of the track-guided vehicle to enable the central buffer coupling to be driven or pivoted out into the coupling plane. In the case of rigidly mounted couplings; i.e. non-extendable or non-pivotable couplings, the part of the protective fairing configured as a front flap is pivoted until it is out of the coupling plane and the coupling is in its coupling-ready position.

The essential components of the kinematics for the front flap are usually accommodated in the coupling compartment so that in the closed state of the coupling compartment; i.e. when the front end opening of the coupling compartment is covered by the part of the protective fairing configured as a front flap, not only the components of the kinematics for the front flap but also the central buffer coupling, and in particular the coupling's coupler head, are protected from the elements.

So-called front nose modules are frequently used to realize the front end protective fairing. Such a front nose module is a modular unit which as such can be mounted to an interface provided on the vehicle front end. A front nose module normally comprises at least one front flap which is pivotable relative to the vehicle front end, the vehicle underframe respectively, in order to expose the front-end opening configured in said front nose module, and thus the coupling compartment, when needed.

The central buffer coupling itself is usually likewise connected to the vehicle front end or vehicle underframe by means of a bearing block. Pivoting the front flap relative to the vehicle front end or the vehicle underframe respectively thus exposes at least the front portion of the central buffer coupling. This holds true for both rigidly mounted couplings; i.e. non-extendable or non-pivotable couplings, as well as cases in which the central buffer coupling needs to be conveyed from its retracted position accommodated within the coupling compartment into its extended/pivoted out and coupling-ready position.

The term "front flap" as used herein refers to the section of the front end protective fairing which covers the opening provided in the frontal region of the vehicle from the front when in its closed state so as to protect the components accommodated in the coupling compartment from the elements. In the front flap's closed state, the vehicle's front end further exhibits an aerodynamically advantageous frontal section, as particularly characterized by streamlined multi-car train sets such as high-speed trains.

As indicated above, the kinematics for the front flap are usually used to pivot the front flap relative to the vehicle underframe, said front flap kinematics comprising at least one actuating element and being designed to expose the opening provided in the frontal region of the vehicle as needed. As indicated above, this is in particular necessary when the vehicle is to be conveyed into a coupling-ready state or when access to the coupling compartment and the coupling components accommodated therein is to be enabled, for example for maintenance reasons.

Even if the known solutions can protect the components arranged on the front end of the rail vehicle, the coupling components in particular, from the elements when the front flap covers the coupling compartment, endeavors have not to date been able to prevent the components contained within the coupling compartment from being exposed to the elements, and possibly impaired, when the vehicle travels with its front flap open. This is for example the case when the front flap cannot be closed due to technical problems with the kinematics for the front flap, for example, or when a further rail vehicle is coupled to the front end of said railway vehicle.

SUMMARY OF THE INVENTION

Based on this problem as set forth, the invention addresses the task of specifying a solution to ensure that the components within the coupling compartment will be protected even when the front flap is open or absent.

This task is solved according to invention by the subject matter of the corresponding claims.

According thereto, a device is proposed which is designed to provide the on-demand sealing of an opening provided in the frontal region of a track-guided vehicle through which the coupling shaft of a central buffer coupling connected to the vehicle extends when the vehicle is in coupled or coupling-ready state. The device according to the invention exhibits a sealing member of variable size and a frame to support said sealing member. The frame together with the sealing member affixed thereto enclose an area through which the coupling shaft of the central buffer coupling can be guided. In order to be able to seal the opening provided in the frontal region of a track-guided vehicle when needed, the sealing member is designed so as to be controllable such that the size of the area covered by the sealing member can be varied.

Advantageous further developments with regard to the inventive device for sealing the opening provided in the frontal region of a track-guided vehicle when so needed are indicated in the corresponding claims.

The task underlying the invention is further solved by a front nose module in accordance with the corresponding claims.

The inventive front nose module which forms the frontal region of a track-guided vehicle exhibits a frame assembly for affixing the front nose module to the front end of the vehicle. The front nose module is further provided with a vehicle front-end opening through which the coupling shaft of a central buffer coupling connected to the front end of the vehicle extends when the vehicle is in coupled or coupling-ready state. A device according to the corresponding claims is further provided in order to be able to seal the vehicle front-end opening of the front nose module when needed.

Advantageous further developments with regard to the inventive front nose module are indicated in the corresponding claims.

Lastly, the underlying task of the invention also relates to a track-guided vehicle, particularly a railway vehicle, having a front nose module according to the corresponding claims and arranged on a vehicle front end as well as a central buffer coupling affixed to a vehicle front end.

Advantageous further developments with regard to the inventive vehicle are indicated in the corresponding claims.

The advantages attainable with the inventive solution are obvious: providing the inventive device exhibiting a sealing member of variable size ensures that also in extreme conditions such as e.g. winter conditions, no snow, moisture or other foreign matter can infiltrate into the coupling compartment, even if the vehicle is travelling with its front flap open. The sealing member is thereby configured such that it is radially expandable, wherein the coupling compartment is sealed off in the expanded state of the sealing member. The central buffer coupling, the coupling shaft of the central buffer coupling respectively, extends through the sealing member so that the central buffer coupling can also realize a coupling-ready or coupled position when the sealing member is in the expanded state. The area enclosed by the sealing member, through which the coupling shaft of the central buffer coupling extends, is preferably configured so as to not limit the pivotability of the coupling shaft relative to the car body, the vehicle underframe respectively, when the sealing member is in its expanded state so as to enable still being able to negotiate curves, traverse elevations or cross depressions.

The sealing member is supported on a frame, a frame assembly respectively. Said frame forms the (sole) installation interface with which the sealing member is mounted either to the front end region of the vehicle or to the coupling. This allows the inventive device to be easily mounted, in particular without needing to change the design of the car body's front end area and/or the design of the front nose module.

The size of the area covered by the sealing member can be varied by suitably controlling said sealing member. In this way, the sealing member can be transformed from its expanded state into its reduced state which is for example necessary when the front flap needs to be opened or closed or when access to the coupling compartment is required, for instance for maintenance reasons.

In one preferred realization of the inventive solution, the sealing member comprises at least one inflatable hollow chamber which is configured and pneumatically or hydraulically controllable such that the area covered by the sealing member enlarges upon the at least one hollow chamber being inflated. It is hereby for example conceivable to implement the sealing member as an inflatable seal, for example in the form of an inflatable clamp or inflatable collar realized as a bellows-type seal.

Alternatively thereto, it is also conceivable to use a mechanically actuated sealing member. Suitable for example would be a rosette-like sealing member which comprises a plurality of fins mounted on an axis able to be rotated together in the direction of the area surrounded by the frame by means of a mechanism so as to in this way enlarge or reduce the area covered by the sealing member.

Preferably, however, an inflatable and preferably bead-like bellows is employed as the sealing member, same being configured so as to expand radially when inflated. In the expanded state of the sealing member, same then presses against the edge region of the vehicle front-end opening and seals it accordingly.

The following will make reference to the accompanying drawings in describing preferred embodiments of the inventive solution.

BRIEF DESCRIPTION OF THE DRAWINGS

The invention description below refers to the accompanying drawings, of which.

DESCRIPTION OF THE PREFERRED EMBODIMENTS

Figure 4A:
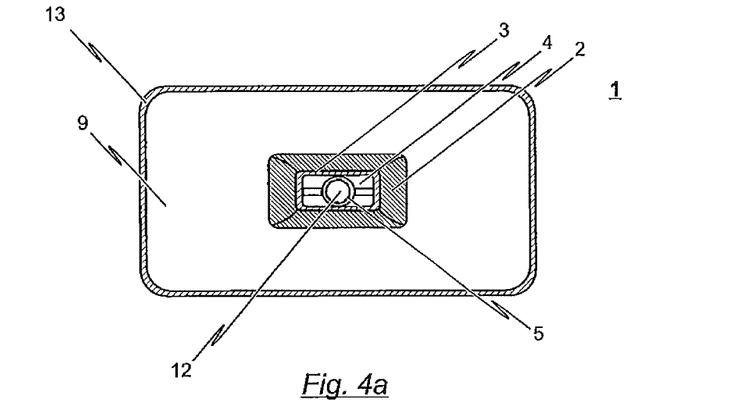
FIG. 4a a schematic plan view of an embodiment of the inventive device with non-expanded sealing member.

The following will first refer to FIGS. 4a, b and 5a, b in describing the principle of the inventive device 1. In detail, FIGS. 4a and b show an embodiment of the inventive solution which makes use of a sealing member 2 supported by a frame 3, wherein the sealing member 2 is radially expandable outwardly in order to seal an opening provided in the frontal region of a track-guided vehicle when needed.

Figure 5A:
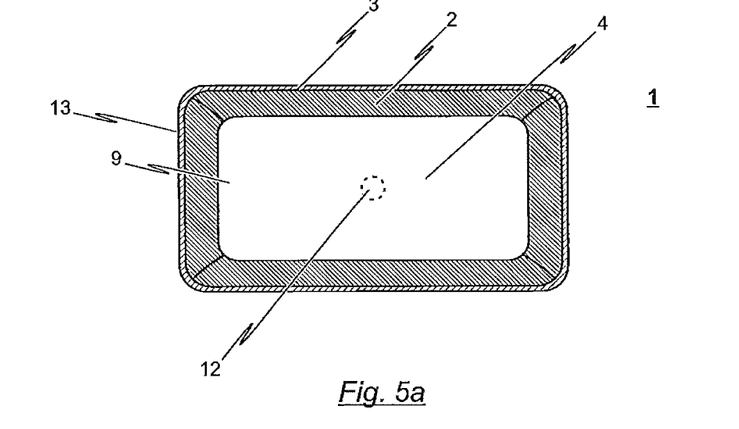
FIG. 5a a schematic plan view of a further embodiment of the inventive device with non-expanded sealing member.
Figure 5B:
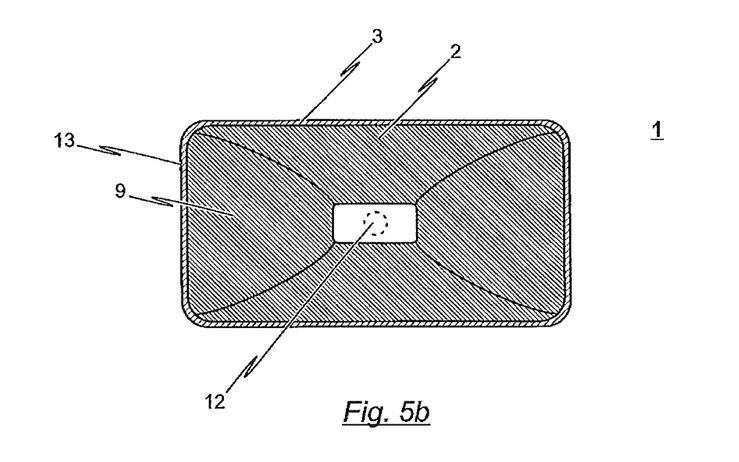
FIG. 5b a schematic plan view of the device according to FIG. 5a with expanded sealing member.

In contrast thereto, FIGS. 5a and b depict an embodiment of the inventive solution in which the sealing member 2 is radially expandable inwardly.

Common to both embodiments is that the size of the sealing member 2, which is realized for example in the form of an inflatable bellows made from a robust and flexible material, can change as needed. The sealing member 2 is thereby preferably configured to be pneumatically or hydraulically controllable such that that the size of the area covered by the sealing member 2 is variable. Specifically, FIGS. 4a and 5a respectively depict the sealing member 2 in its non-expanded state. In contrast, FIGS. 4b and 5b depict the sealing member 2 in a state in which it is expanded such that the size of the area covered by said sealing member 2 is correspondingly enlarged.

In both embodiments, the sealing member 2 is supported by a frame 3. Said frame 3 assumes a supporting function and at the same time serves as the sole interface connecting the sealing member 2 either to the front nose of a track-guided vehicle or to a central buffer coupling articulated to the vehicle underframe of a track-guided vehicle so that the sealing member 2 is firmly seated. The embodiment depicted in FIGS. 4a and 4b is realized for mounting to a central buffer coupling, the coupling shaft of a central buffer coupling respectively, as will be described below in greater detail with reference to the embodiment depicted in FIGS. 1 to 3.

Figure 4B:
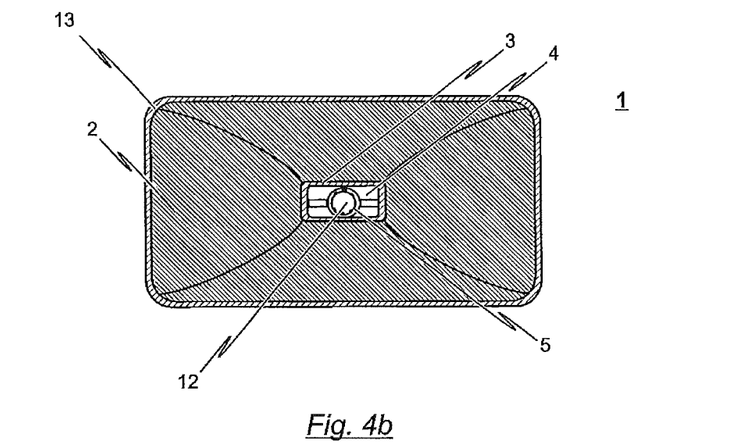
FIG. 4b a schematic plan view of the device according to FIG. 4a with expanded sealing member.

As can be seen from the schematic depiction provided in FIGS. 4a and 4b, the frame 3 together with the sealing member 2 affixed thereon enclose an area 4 in this embodiment through which the coupling shaft 12 of a central buffer coupling can be guided. The sealing member 2 is hereby attached to the outer periphery of the frame 3 such that the sealing member 2 can radially expand outwardly. The frame 3 is configured such that the sealing member 2 is radially spaced from an opening 5 provided preferably centrally in area 4 so that the sealing member 2 in its expanded state (cf. FIG. 4b) is far enough distanced from the coupler head of the central buffer coupling so as not to hinder the functioning of said coupler head. The coupling shaft 11 of the central buffer coupling is guided through the above-mentioned opening 5.

On the other hand, the embodiment depicted in FIGS. 5a and 5b is not configured to be mounted to the coupling shaft 11 of a central buffer coupling, but rather to be mounted preferably to the peripheral area 13 of an opening 9 provided in the front end of a vehicle nose. To this end, the sealing member 2 is arranged within the area 4 enclosed by the frame 3 such that the sealing member 2 can radially expand inwardly into area 4.

In both embodiments, the frame 3, respectively the sealing member 2, is configured so as to ensure the coupling can move within the area 4 enclosed by the frame 3 together with the sealing member 2 affixed thereto.

Figure 1:
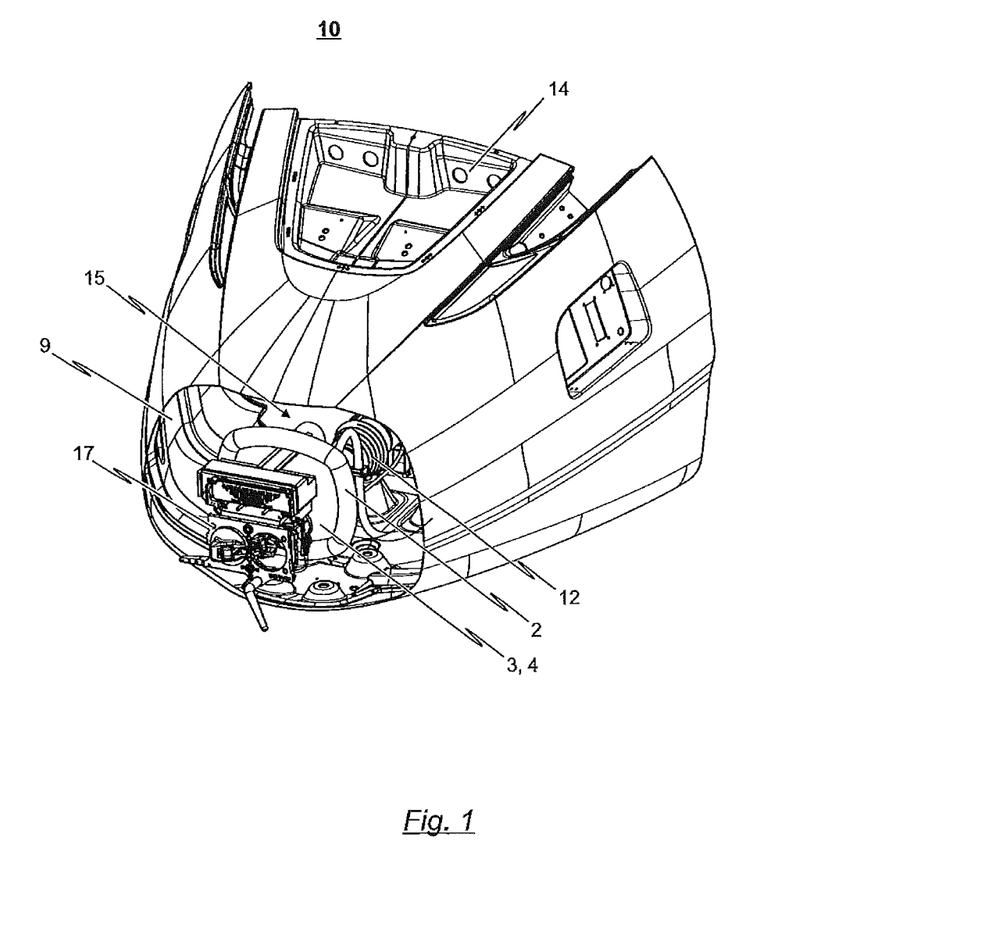
FIG. 1 a perspective view of a front nose module having a device to seal the vehicle front-end opening in the front node module when needed in accordance with an embodiment of the invention, wherein the sealing member of the sealing device is in its non-expanded state.
Figure 2:
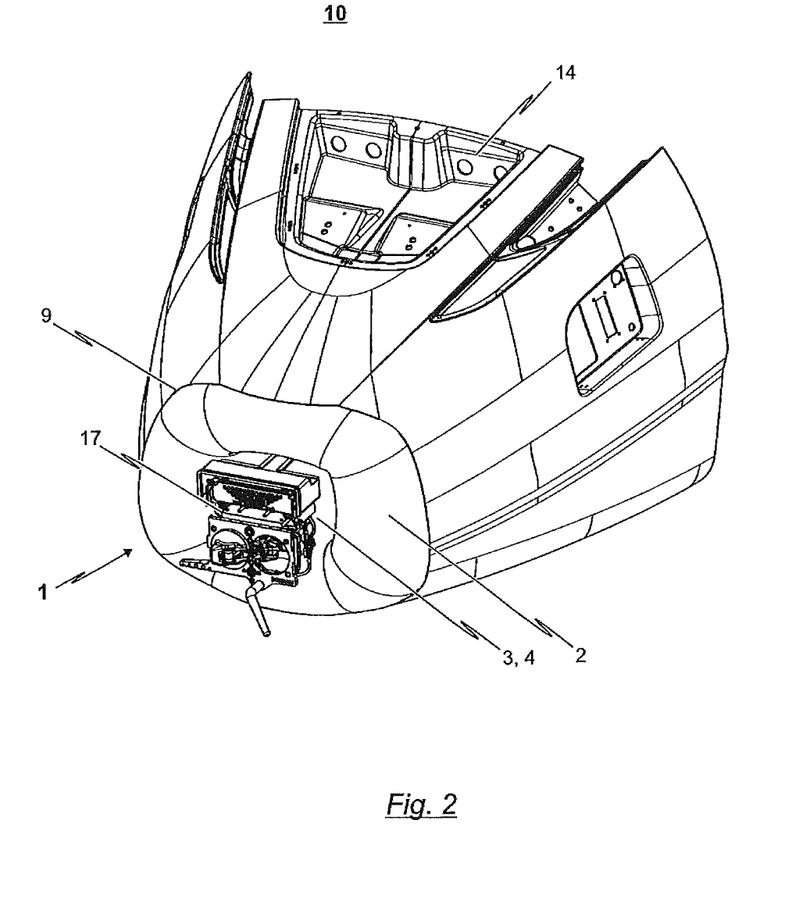
FIG. 2 a perspective view of the front nose module according to FIG. 1 in a state in which the sealing member is in its expanded state.
Figure 3:
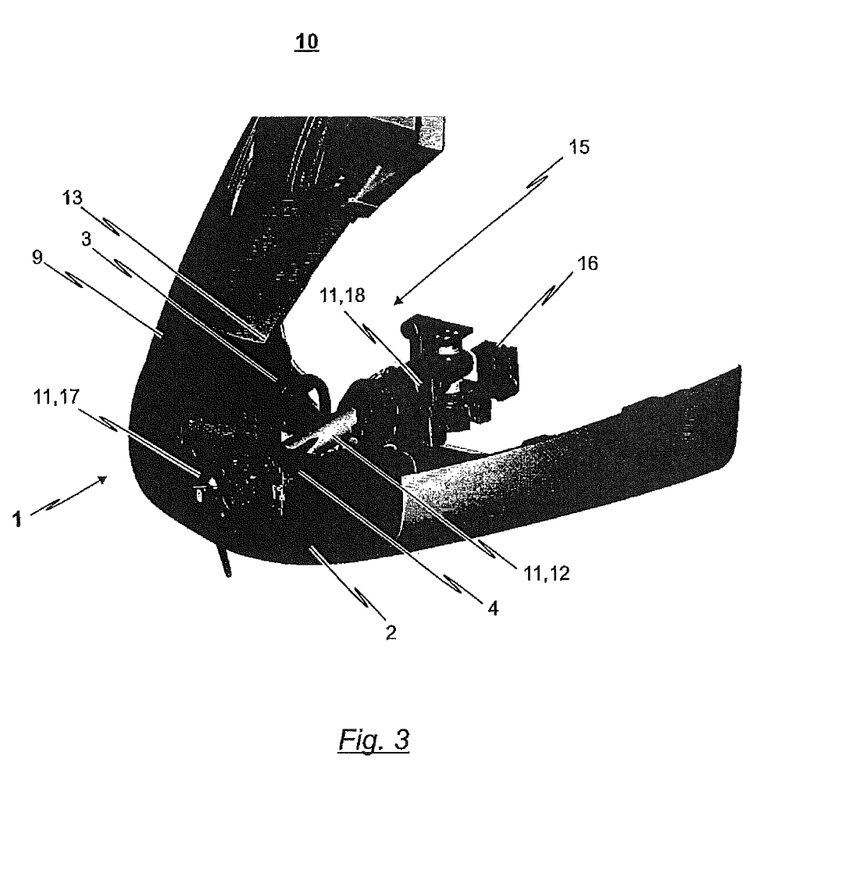
FIG. 3 a partly sectional view of the front nose module according to FIG. 2.

The following will refer to the depictions provided in FIGS. 1 to 3 in describing a preferred embodiment of the inventive solution in greater detail. Specifically, FIG. 1 shows a perspective view of a front nose module 10, wherein said front nose module 10 is equipped with an embodiment of the inventive device 1 to seal a vehicle-side opening 9 provided in the front nose module 10 when needed.

FIG. 2 is a perspective view of the front nose module 10 according to FIG. 1, however wherein the sealing member 2 of the inventive device 1 is now in its expanded state in which the sealing member 2 presses against the edge region of the vehicle-side opening 9 provided in the front nose module and thus provides a corresponding sealing. FIG. 3 is a partly sectional depiction of the front nose module 10 according to FIG. 2.

The front nose module 10 depicted in FIGS. 1 to 3 constitutes the frontal fairing of a vehicle, wherein this frontal fairing can be connected by means of an interface (here: frame assembly 14) to the front end or underframe of a vehicle, a motor vehicle in particular. The front nose module 10 is preferably a modular unit which can be mounted as such to an interface provided on the vehicle front end.

Although not shown in the drawings, the front nose module 10 can exhibit a front flap which is pivotable relative to the front nose module 10 in order to expose the opening 9 configured in the front end of the front nose module 10, and thus the enclosed space (coupling compartment 15) behind the nose cone when needed. For the sake of clarity, the front node module 10 depicted in FIGS. 1 to 3 forgoes the depiction of such a front flap.

As can be seen from the partly sectional view according to FIG. 3, a central buffer coupling 11 is at least partly accommodated in the coupling compartment 9 formed by the front nose module 10. The central buffer coupling 11 is articulated to a not shown vehicle front end or a likewise not shown vehicle underframe by means of a bearing block 16 so as to be horizontally and vertically pivotable.

The central buffer coupling 11 comprises a coupling shaft 12 as well as a coupler head 17 arranged at the front end region of the coupling shaft 12. An energy absorption element 18 can be integrated into the coupling shaft 12 in order to preferably regeneratively absorb the tractive and impact forces occurring during operation and routed to the vehicle underframe by the central buffer coupling 11. Such energy absorption elements are known in the prior art and will not be described in any greater detail herein.

Not only parts of the central buffer coupling 11 are located in the coupling compartment 15 formed by the front node module 10, but also the essential components of the kinematics for the front flap which is used to pivot said front flap (not shown in the drawings) relative to the front nose module 10.

So that the front end opening 9 of the front nose module 10 can be sealed off during travel, and namely also when a front flap is in its open state, the front nose module 10 according to the embodiment depicted in FIGS. 1 to 3 is equipped with a device 1 to seal the opening 9 provided in the frontal region of the front nose module 10 as needed. The inventive device 1 is in particular realized as semi-permanent snow protection and should be used particularly in extreme weather conditions when there is the need to effectively prevent snow or moisture from infiltrating into the coupling compartment 15 formed by the front nose module 10, since such climatic conditions can impair the components accommodated within the coupling compartment 15, for example components of the kinematics for the front flap or components of the central buffer coupling 11.

The device 1 for the on-demand sealing of the opening 9 exhibits a frame 3 which supports a sealing member 2. The frame 3 serves as the only mounting interface for device 1 and is fixedly connected to the central buffer coupling 11, specifically the coupling shaft 12 of central buffer coupling 11, in the embodiment depicted in FIGS. 1 to 3. The frame 3 together with the sealing member 2 supported by the frame 3 enclose an area 4 through which the coupling shaft 12 of the central buffer coupling 11 is guided. This area 4 is selected such that the sealing member 2 is sufficiently distanced radially from the coupling shaft 12 so that said sealing member 2 cannot touch the components of the coupler head 17 when in its expanded state (cf. FIGS. 2 and 3), wherein the pivotability of the central buffer coupling 11 relative to the vehicle underframe and relative to the front nose module 10 is in particular still ensured.

In detail and as can also be seen particularly from the partly sectional depiction of FIG. 3, the coupling shaft 12 of the central buffer coupling 11 is guided through the area 4 enclosed by the frame 3 and the sealing member 2 affixed thereon in the embodiment of the inventive front nose module 10 depicted therein, wherein the frame 3 is preferably detachable affixed to the coupling shaft 12 of the central buffer coupling 11, and wherein the sealing member 2 is configured so as to be expandable such that it preferably presses radially against a peripheral area 13 of the opening 9 provided in the frontal region of the vehicle, the face of the front nose module 10 respectively, when said sealing member 2 is in its expanded state.

The sealing member 2 employed in FIGS. 1 to 3 exhibits at least one inflatable hollow chamber which is configured and pneumatically or hydraulically controllable such that the area covered by the sealing member 2 enlarges upon the at least one hollow chamber being inflated. The sealing member 2 is in particular configured as an inflatable and bead-like bellows which expands radially when inflated, as directly follows from considering FIG. 1 in conjunction with 2.

The embodiment depicted in FIGS. 1 to 3 makes use of a rigidly mounted central buffer coupling 11. However, it would of course also be conceivable to configure the central buffer coupling 11 so as to be extendable and retractable or swing inward and outward.

The solution according to the invention is particularly suitable as semi-permanent snow protection for central buffer couplings. As noted above, the inventive device consists of a support 3 as well as a sealing member 2 or bellows made from a robust, flexible material. The support 3 can be mounted to the central buffer coupling 11, the coupling shaft 12 of the central buffer coupling 11 respectively, or to the vehicle bow, and in particular at the peripheral area 13 of a frontal region opening 9 provided in the vehicle bow.

When sealing off opening 9 is not required, the sealing member 2 is folded up for example by a mechanical system or compressed air and fits snugly and compactly against the support 3 (see in particular the FIG. 1 depiction hereto).

Whereas when sealing off opening 9 is desired, the mechanical or compressed air system can expand the sealing member 2 until said sealing member 2 covers the area between the coupling 11 and the peripheral area 13. The movement of the central buffer coupling 11 within the support 3 and/or the sealing member 2 relative to the vehicle underframe as well as relative to the front nose module 10 is also ensured in this state.

An advantage of this configuration is in particular also to be seen in that the device 1 according to the invention only requires one mounting interface, either on the central buffer coupling 11 or on the vehicle bow. Vehicles can thus also be retrofitted at later points in time.

In the non-expanded state of the sealing member 2, same does not obstruct the opening and/or closing of a front flap.

The invention is not limited to the embodiments depicted in the drawings but rather yields from a consideration of all the features disclosed herein.

LIST OF REFERENCE NUMERALS

1 on-demand sealing device
2 sealing member
3 frame
4 frame-enclosed area
5 opening for coupling shaft
9 coupling compartment front-end opening
10 front nose module
11 central buffer coupling
12 coupling shaft
13 peripheral area of coupling compartment front-end opening
14 frame assembly of front nose module 10
15 coupling compartment
16 bearing block
17 coupler head
18 energy absorption element

What is claimed is:

1. A device for on-demand sealing of an opening provided in a frontal region of a track-guided vehicle through which a coupling shaft of a central buffer coupling connected to the track-guided vehicle extends when the track-guided vehicle is in a coupled or a coupling-ready state, wherein the device comprises:
   a sealing member of variable size; and
   a frame for supporting the sealing member,
   wherein the frame together with the sealing member affixed thereto enclose the opening provided in the frontal region of the track-guided vehicle through which the coupling shaft of the central buffer coupling can be guided, and wherein the sealing member is controllable such that the size of the sealing member can be varied, and
   wherein the sealing member includes at least one inflatable hollow chamber which is configured and pneumatically or hydraulically controllable such that an area enclosed by the sealing member enlarges upon the at least one hollow chamber being inflated to expand and press radially against a peripheral area of the opening provided in the frontal region of the track-guided vehicle, or
   wherein the sealing member is of a rosette-like configuration and includes a plurality of fins respectively mounted on an axis able to be rotated together in a direction of the opening surrounded by the frame by means of a mechanism so as to expand inwardly from the peripheral area of the opening provided in the frontal region of the track-guided vehicle to enlarge the area enclosed by the sealing member.

2. The device according to claim 1,
   wherein the sealing member is configured as an inflatable and bead-like bellows designed to expand radially when inflated.

3. The device according to claim 1,
   wherein the frame is configured to be detachable affixed to the central buffer coupling of a car, and wherein the sealing member is configured to press radially against edge regions of the peripheral area of the opening provided in the frontal region of the track-guided vehicle when said sealing member is in its expanded state.

4. A front nose module for a track-guided vehicle having a frame assembly to affix the front nose module to a front end of the track-guided vehicle, wherein the front nose module exhibits a vehicle front-end opening through which a coupling shaft of a central buffer coupling affixed to the front end of the track-guided vehicle extends in a coupled or a coupling-ready state of the track-guided vehicle, and wherein the front nose module further includes a sealing device for on-demand sealing of the vehicle front-end opening by expanding and pressing radially against a peripheral area of the vehicle front-end opening of the track-guided vehicle or by expanding inwardly from the peripheral area of the vehicle front-end opening of the track-guided vehicle.

5. The front nose module according to claim 4, further comprising a flap assembly having at least one front flap and front flap kinematics, wherein the at least one front flap can be conveyed from an opened state in which the vehicle front-end opening provided in the front nose module is exposed into a closed state in which the vehicle front-end opening is closed.

6. The front nose module according to claim 5,
   wherein the front flap kinematics are disposed to be at least partly accommodated within a coupling compartment at least partly enclosed by the front nose module.

7. The front nose module according to claim 4 wherein the central buffer coupling is affixed to said vehicle front end.

8. The front nose module according to claim 4,
wherein the coupling shaft of the central buffer coupling is guided through the vehicle front-end opening surrounded by the frame and the sealing member affixed thereto, wherein the frame is detachable affixed to the coupling shaft of the central buffer coupling, and wherein the sealing member is configured so as to be expandable such that it presses radially against edge regions of the peripheral area of the vehicle front-end opening of the track-guided vehicle.

9. The front nose module according to claim 4,
wherein the central buffer coupling can be conveyed from a first state in which said central buffer coupling is accommodated within a coupling compartment at least partly enclosed by the front nose module into a second state in which said central buffer coupling extends at least partly through the vehicle front-end opening.

10. The front nose module according to claim 4,
wherein the central buffer coupling is configured so as to be extendable and retractable or swing inward and outward for bringing the central buffer coupling from a first state into a second state and vice versa.

\* \* \* \* \*

UNITED STATES PATENT AND TRADEMARK OFFICE
CERTIFICATE OF CORRECTION

PATENT NO.        : 8,622,003 B2
APPLICATION NO.   : 13/464218
DATED             : January 7, 2014
INVENTOR(S)       : Christian Radewagen Page 1 of 1

It is certified that error appears in the above-identified patent and that said Letters Patent is hereby corrected as shown below:

Add to the Title Page
(30)    Foreign Application Priority Data
   May 20, 2011   (EP) 11004193.6

Signed and Sealed this
Second Day of June, 2015

Michelle K. Lee
*Director of the United States Patent and Trademark Office*